United States Patent [19]

Rindo

[11] Patent Number: 4,582,671
[45] Date of Patent: Apr. 15, 1986

[54] FAILED FUEL LOCATION DETECTOR

[75] Inventor: Hiroshi Rindo, Mito, Japan

[73] Assignee: Doryokuro Kakunenryo Kaihatsu Jigyodan, Tokyo, Japan

[21] Appl. No.: 474,347

[22] Filed: Mar. 11, 1983

[30] Foreign Application Priority Data

Mar. 19, 1982 [JP] Japan .................................. 57-44214

[51] Int. Cl.⁴ ............................................ G21C 17/04
[52] U.S. Cl. ...................................... 376/251; 376/253
[58] Field of Search ........................ 376/251, 253, 246

[56] References Cited

U.S. PATENT DOCUMENTS

| | | | |
|---|---|---|---|
| 3,413,469 | 11/1968 | Guyonvarh et al. | 376/253 |
| 3,736,798 | 6/1973 | Wood et al. | 376/246 |
| 3,762,993 | 10/1973 | Jones | 376/253 |
| 3,775,245 | 11/1973 | Delisle et al. | 376/253 |
| 3,806,409 | 4/1974 | Debergh et al. | 376/253 |
| 3,989,945 | 11/1976 | Cooper | 376/253 |
| 4,080,250 | 3/1978 | Honekamp et al. | 376/251 |
| 4,135,970 | 1/1979 | Mitsutsuka et al. | 376/253 |
| 4,347,214 | 8/1982 | Sato et al. | 376/251 |

FOREIGN PATENT DOCUMENTS

| | | | |
|---|---|---|---|
| 0013216 | 9/1980 | European Pat. Off. | 376/253 |
| 0064462 | 10/1982 | European Pat. Off. | 376/253 |
| 2146924 | 3/1972 | Fed. Rep. of Germany | 376/253 |
| 3006555 | 9/1980 | Fed. Rep. of Germany | 376/253 |
| 54-137598 | 10/1979 | Japan | 376/253 |

Primary Examiner—Salvatore Cangialosi
Attorney, Agent, or Firm—Wenderoth, Lind, Ponack

[57] ABSTRACT

An apparatus for detecting the location of a failed fuel assembly among a number of in-core fuel assemblies, which utilizes a combination of a tag gas system and a selector valve system. The fuel assemblies are divided into a plurality of groups and all the fuel assemblies in the same group are tagged with the same tag gas. Coolants flowing out from the respective fuel assemblies are individually sampled by sampling pipes and led into intermediate mixers wherein the coolants are mixed. The groups of fuel assemblies are mutually connected via the sampling pipes to the intermediate mixers such that each group of fuel assemblies has the sampling pipes extending therefrom and connected to each of the intermediate mixers. The group to which the failed fuel assembly belongs is identified by the tag gas system, and the selector valve system identifies which mixed coolant from the intermediate mixers contains fission products released from the failed fuel assembly.

5 Claims, 4 Drawing Figures

FAILED FUEL LOCATION DETECTOR

BACKGROUND OF THE INVENTION

This invention relates to an apparatus for detecting the location of a defective or failed fuel assembly containing a failed fuel pin in a nuclear reactor. More particularly, the present invention relates to a failed fuel location detector utilizing a combination of a tag gas system and a selector valve system that have been employed independently in the past.

Conventional failed fuel location detectors for use in a fast breeder reactor can be classified into tag gas systems and selector valve systems. In the tag gas system, tag gas (tracer gas) consisting of rare gases such as Xe, Kr or the like, that are inert to irradation, is sealed in a capsule or the like, the capsule is introduced into each of a plurality of fuel pins constituting a fuel assembly and the tag gas is released into the fuel pin by subsequently opening each capsule. In this case, several kinds of rare gas isotopes are mixed at various ratios (tag gas ratios) and the isotope ratios are varied so that each of the fuel assemblies can be identified by a specific isotope ratio. If a certain fuel pin fails, the tag gas is released from the failed fuel pin together with fission product gases, and these gasses move into a cover gas space within a reactor vessel through liquid sodium coolant circulating inside the reactor vessel. Since the tag gas is diluted by the cover gas to the order of parts per billion (ppb), it is concentrated up to a concentration necessary for analysis and then subjected to mass spectrometer measurements. The gas ratio thus detected is input to a computer so that the calculated ratio is compared with the predetermined ratios to determine the location of the defective fuel assembly containing the failed fuel pin.

On the other hand, the selector valve system utilizes a selector valve device as shown diagrammatically in FIGS. 1 and 2. In the selector valve device 1, a thin sampling pipe 2 is disposed at a coolant outlet of each fuel assembly (not shown) so as to separately sample part of liquid metal coolant flowing out from each fuel assembly. The ends of these sampling pipes 2 are gathered at one position inside the reactor and are arranged so as to open circumferentially at the periphery of a sliding plate 3. A rotary pad 6 is slidably provided on the sliding plate 3 and is rotated by a motor 5 via a rotary shaft 4. The rotary pad is connected to a delayed neutron detector 9 by a tube 7 via an electromagnetic pump 8. As the rotary pad 6 rotates slidably on the periphery of the sliding plate 3, a particular sampling pipe 2 opened at the periphery of the sliding plate 3 is selected and part of the liquid metal coolant flowing out from the corresponding coolant outlet of the fuel assembly is sampled. When a fuel failure occurs, the fission products are emitted into the coolant. The fission products contain delayed neutron precursors that emit delayed neutrons to disintegrate. These delayed neutrons produced as a result of the decay of the precursor are detected by the delayed neutron detector 9, thereby determining the location of the failed fuel assembly.

Both of these systems has merits and demerits, but in a large nuclear reactor on a commercial scale, the number of fuel assemblies employed is 300 or more so that the systems inevitably become large and complicated.

In the tag gas system, for example, as the number of fuel assemblies becomes larger, more kinds of tag gases are needed and the absolute quantity of each of the tag gas nuclides becomes smaller necessarily. Accordingly, the concentrator necessary for the analysis of the tag gas must have a higher performance, and the analyzer must have a higher sensitivity. Thus, not only does the system become complicated and expensive as a whole, but also a longer period of time is necessary for the detection of the failed fuel assembly.

In the selector valve system, on the other hand, the system becomes vary large in size if the number of fuel assemblies exceeds 300 and the space must be secured for this system in addition to the essential space required for an upper core structure of the reactor. Since the upper core structure is thus restricted in space, it inevitably becomes complicated in construction. Moreover, since a large load is applied to a point on the rotary pad of the selector valve device, another problem develops in conjunction with the resistance to earthquakes.

SUMMARY OF THE INVENTION

It is therefore an object of the present invention to provide an improved apparatus for detecting the location of failed fuel rapidly, which eliminates all the above-described disadvantages in connection with the prior art techniques, that is, the problem of the increase in cost of the system when the tag gas system is employed alone, and the problem of the complicated construction of the upper core structure of the reactor when the selector valve system is employed alone.

It is another object of the present invention to provide a failed fuel location detector which is simple in construction as a whole, can be produced at a reduced cost, and which enables easy maintenance.

The failed fuel location detector of the present invention is applied to a nuclear reactor having a core structure in which a large number of fuel assemblies constituting the operating core region are divided into a plurality of groups and the same tag gas is sealed in fuel pins of the fuel assemblies belonging to the same group.

Thus, the same tag gas is sealed in every fuel pin of each fuel assembly, and the fuel pins of every fuel assembly in the same group contain therein the same tag gas. In other words, the fuel pins of fuel assemblies in one group contain one tag gas, and the fuel pins of fuel assemblies in another group contain another tag gas. The term "same tag gas" used herein means a tag gas having the same tag gas nuclide as well as the same tag gas ratio. The term "group" into which the fuel assemblies are divided means a virtual group of a plurality of fuel assemblies and it is sufficient if the positions of the respective fuel assemblies belonging to a particular group (i.e., the fuel assemblies having the same tag gas) can be determined inside the core. The group may consist of fuel assemblies lying in a physically adjacent relation to one another, but the physical relation is not important in the invention and the group may consist of fuel assemblies in a spaced relation.

For a large nuclear reactor consisting of approximately three hundred (300) fuel assemblies, for example, it is preferable that the fuel assemblies are divided into approximately fifteen (15) groups, each consisting of approximately twenty (20) fuel assemblies.

Conceptionally the improved apparatus of detecting the failed fuel location in accordance with the present invention utilizes a combination of the conventional tag gas system and the conventional selector valve system. The apparatus detects the presence of a fuel assembly containing a failed fuel pin from among the large number of fuel assemblies that constitute the reactor core, and when such failed fuel asembly is detected, the apparatus can determine the location of the failed fuel assembly.

The detecting apparatus in accordance with the present invention includes means for monitoring the presence of fission product gases in a cover gas in a reactor vessel, and means for detecting the kind of tag gas in the cover gas.

When the presence of fission product gases in the cover gas is detected by the fission product gas monitoring means, it is possible to know that any failure has occurred in a fuel pin. And when the kind of the tag gas released from the failed fuel into the cover gas is identified by the tag gas detecting means, it is possible to identify the group to which the fuel assembly containing the failed fuel pin belongs.

The detecting apparatus of the present invention further includes a plurality of sampling pipes for individually sampling coolant flowing out from each of the fuel assemblies, a plurality of intermediate mixers for gathering and mixing the coolants from the sampling pipes of each group of fuel assemblies, (from a subset of the fuel assemblies) a selector valve device for sequentially collecting the mixed coolants, and a delayed neutron detector for detecting delayed neutrons in the mixed coolants.

The delayed neutron detector makes it possible to identify which mixed coolant from the intermediate mixers contains fission products, if any.

Thus, the location of the failed fuel assembly can be detected from the identification of the group to which the failed fuel assembly belongs and which is determined by the tag gas detecting means, and from the identification of the intermediate mixer which provides the mixed coolant containing fission products (or the corresponding subset of fuel assemblies) and which is determined by the selector valve device.

These and other objects and advantages of the present invention will become more apparent from the detailed description of a preferred embodiment thereof to be taken in conjunction with the accompanying drawings.

DESCRIPTION OF THE PREFERRED EMBODIMENT

Figure 1:
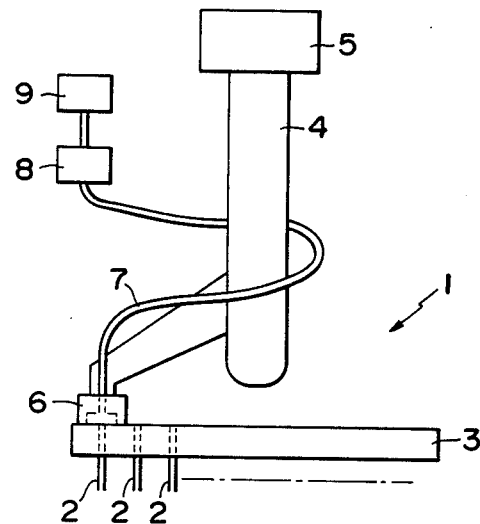
FIG. 1 is a perspective view showing a device used in the conventional selector valve system.
Figure 2:
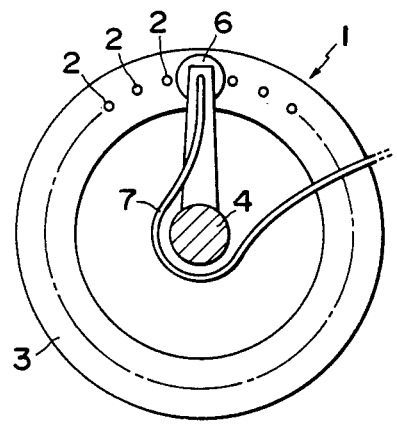
FIG. 2 is a plan view of FIG. 1.
Figure 3:
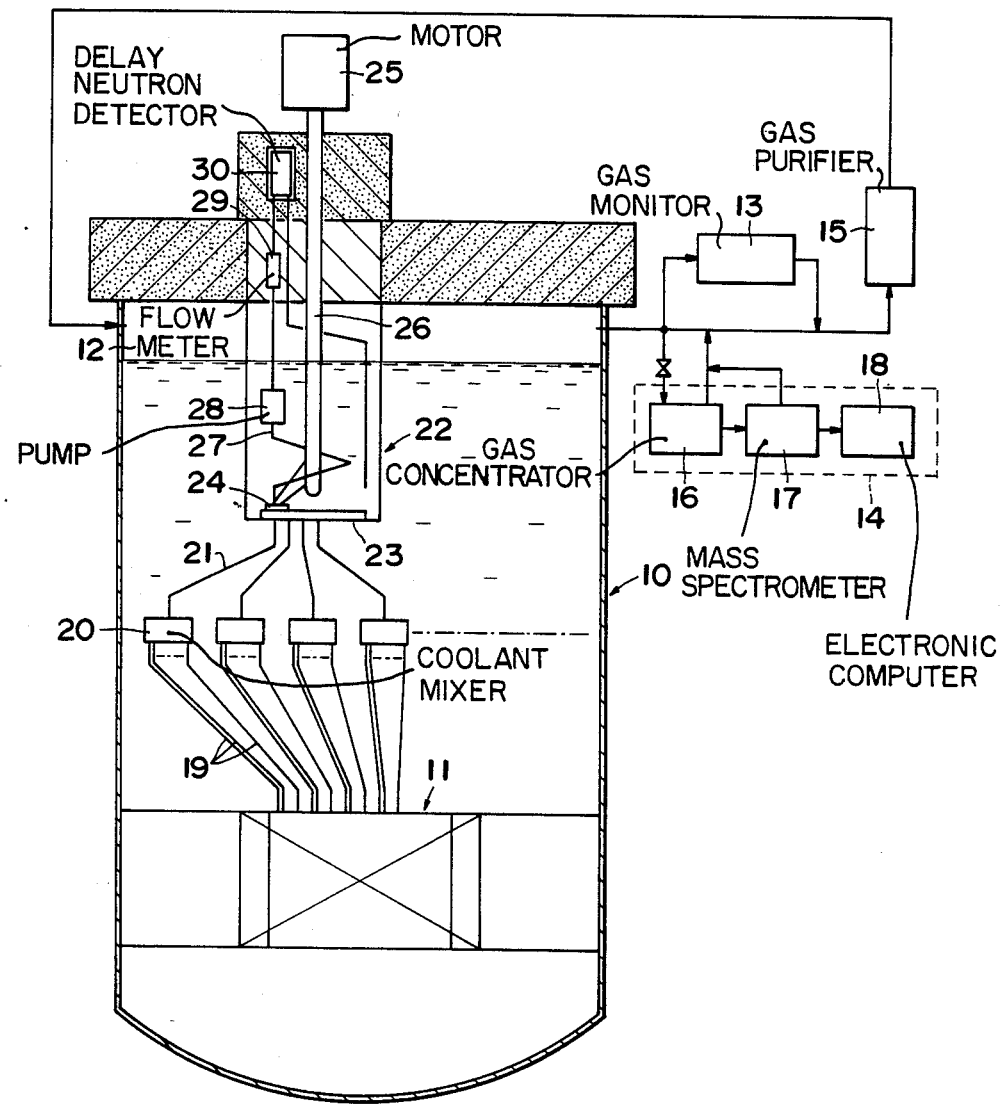
FIG. 3 is a simplified schematic view illustrating one preferred embodiment of the apparatus in accordance with the present invention.

FIG. 3 schematically illustrates one preferred embodiment of the present invention. As stated previously, the apparatus of the present invention is applied to a nuclear reactor having a core structure of the type in which a large number of fuel assemblies (not shown) constituting an operating core region 11 inside a reactor vessel are divided into a plurality of groups, and the same tag gas is sealed in fuel pins of the fuel assemblies belonging to the same group. If the number of fuel assemblies constituting the operating core region 11 is three hundred (300), for example, fifteen (15) groups each having twenty (20) fuel assemblies can be formed and the twenty fuel assemblies of each group are each tagged by the same tag gas.

The apparatus of the present invention includes means 13 for monitoring the presence of fission product gases in a cover gas space 12 inside a reactor vessel 10, and means 14 for detecting the kind of the tag gas in the cover gas space 12.

The fission product gas monitor 13 is disposed upstream of a cover gas purifier 15 in a cover gas circulation system of the reactor, and it constantly checks for the absence or presence of fission product gases that might be released from the failed fuel pin into the cover gas. The tag gas detector 14 is also disposed upstream of the cover gas purifier 15 in the cover gas circulation system, and it consists of a tag gas concentrator 16, a mass spectrometer 17, and an electronic computer 18. Such tag gas detector 14 has substantially the same construction as that usually used in conventional tag gas systems.

The apparatus of the present invention further includes a number of coolant sampling pipes 19, each of which is communicated with a coolant outflow of each fuel assembly. Several sampling pipes 19 are joined together to form a plurality of pipe groups, and the sampling pipes in each pipe group are connected to respective intermediate mixers 20. The number of the intermediate mixers corresponds to the number of fuel assemblies in one group of fuel assemblies. The groups of fuel assemblies are mutually connected via the sampling pipes 19 to the intermediate mixers 20 such that each group of fuel assemblies has the sampling pipes 19 extending therefrom and connected to each of the intermediate mixers 20. That is, every group of fuel assemblies has one sampling pipe connected to one intermediate mixer and another sampling pipe connected to another intermediate mixer.

Figure 4:
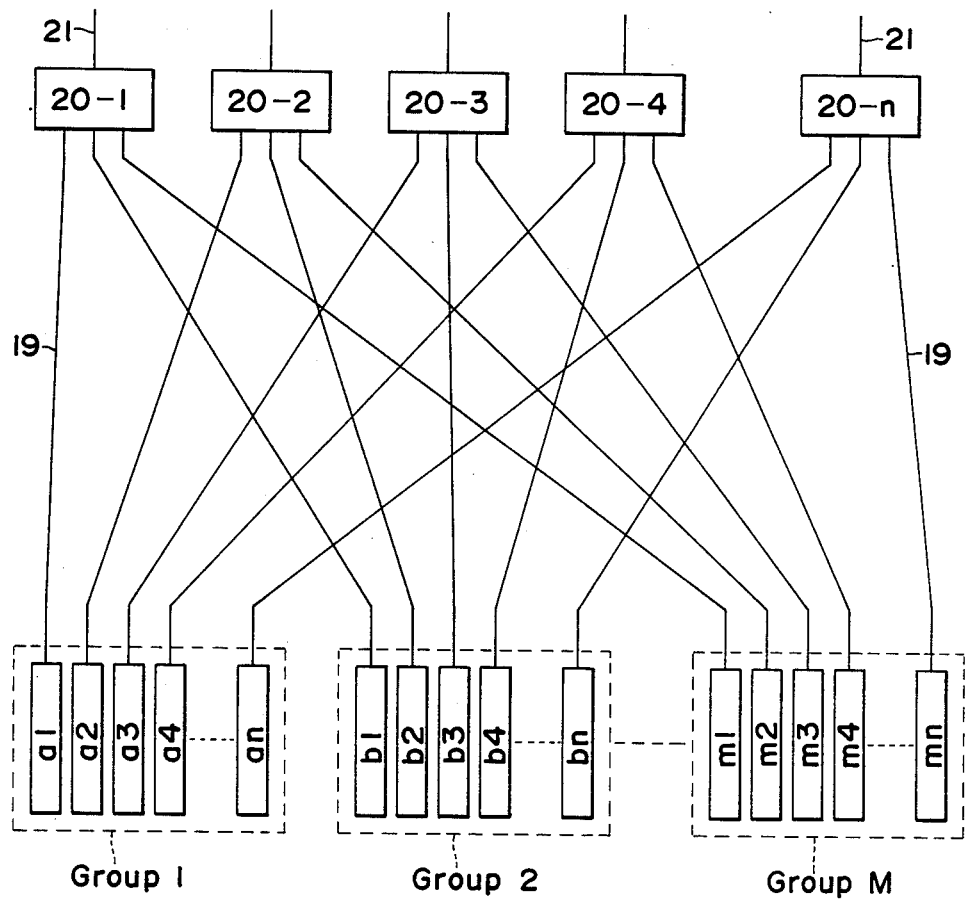
FIG. 4 is a detailed schematic view of the connections between the fuel assemblies and the intermediate mixers in accordance with the invention.

The connections between the fuel assemblies and the intermediate mixers are further explained with reference to FIG. 4 in which the fuel assembly groups 1, 2 and M comprise the fuel assemblies a1-an, b1-bn and m1-mn, respectively. One fuel assembly is selected from each fuel assembly group and is connected to one intermediate mixer via the sampling pipe 19. Thus, the fuel assemblies a1, b1 and m1 selected respectively from the groups 1, 2 and M are connected to the intermediate mixer 20-1, and the fuel assemblies a2, b2 and m2 selected respectively from the groups 1, 2 and M are connected to the intermediate mixer 20-2. In the same manner, the intermediate mixer 20-3 is connected to the fuel assemblies a3, b3 and m3, the intermediate mixer 20-4 is connected to the fuel assemblies a4, b4 and m4, and the intermediate mixer 20-n is connected to the fuel assemblies an, bn and mn. The coolants sampled from the different groups of fuel assemblies are therefore mixed in one intermediate mixer.

The coolants thus mixed by each intermediate mixer 20 are led into a selector valve device 22 through connecting pipes 21. The construction of this selector valve device is fundamentally the same as that of the usual device used in conventional selector valve systems. The connecting pipes 21 are arranged so that their ends open circumferentially at the periphery of a sliding plate 23, and a rotary pad 24 is provided slidably on the sliding plate 23. The pad 24 is continuously rotated by a motor 25 via a rotary shaft 26 and is connected to a delay neutron detector 30 by a tube 27 via an electromagnetic pump 28 and a flowmeter 29.

Since the number of fuel assemblies constituting the operating core region is three hundred (300) in this embodiment, the different kinds of tag gases may be fifteen (15) if twenty (20) fuel assemblies form one group. The number of sampling pipes 19 is three hundred (300), and the numbers of intermediate mixers 20 and connecting pipes 21 are each twenty (20).

Preferably, the apparatus of the present invention is operated in the following manner. When a particular fuel pin fails, fission product gases are emitted from the failed fuel pin, and at the same time the tag gas sealed in the failed fuel pin is also emitted irrespective of the mode of failure (gas leak failure or burst failure) and the gases move into the cover gas space 12. Accordingly, the presence of the failed fuel pin can be detected immeditely if the presence of fission product gases in the cover gas is continuously monitored by the fission product gas monitor 13.

When fission product gases are detected in the cover gas, the tag gas detector 14 is operated to determine the kind of tag gas in the cover gas. The tag gas in the cover gas is recovered and concentrated by the tag gas concentrator 16 and is analyzed by the mass spectrometer 17, and the result of the analysis is input to the electronic computer 18 to compare the calculation result with predetermined tag gas data and determine the group to which the failed fuel assembly (containing the failed fuel pin) belongs. Simultaneously, the selector valve device 22 is operated and the mixed coolants collected from each intermediate mixer 20 are sequentially sampled one by one, followed by a measurement of the delayed neutrons by the delayed neutron detector 30. Thus, the abnormal intermediate mixer 20 communicated to the failed fuel assembly is determined. In this manner, the location of the failed fuel assembly can be primarily determined from the identification of the group to which the failed fuel assembly belongs and the identification of the abnormal intermediate mixer. The former identification is accomplished by determining, by means of the tag gas detector 14, the kind of the tag gas released from the failed fuel assembly, and the latter identification is accomplished by detecting the delayed neutrons in the mixed coolant by means of the selector valve device 22.

Further, the time efficiency of the reactor can be improved by operating the apparatus of the present invention in the following manner. First, the reactor operation is not stopped even when fission product gases are detected in the circulating cover gas, if it is such a small amount that it can not be detected by the tag gas detector 14. Secondly, the selector valve device 22 and the delayed neutron detector 30 can be operated so as to determine in advance the abnormal intermediate mixer communicated with the failed fuel assembly. Soon afterwards, when the amount of the tag gas released from the failed fuel assembly becomes greater and the kind of the released tag gas is identified by the tag gas detector 14, the group to which the failed fuel assembly belongs can be identified and the location of the failed fuel assembly can thus be determined. At this time, the reactor core operation is stopped to replace the failed fuel assembly.

Since the system of the present invention is constructed by organically combining a conventional tag gas system with a conventional selector valve system in the manner described above, the system of the invention as a whole can be markedly simplified and the location of the failed fuel assembly can be detected far more efficiently than when either of the conventional systems is employed individually. In other words, the present invention markedly reduces the time required for detecting the location of a failed fuel assembly and can rationally determine the time at which the failed fuel assembly should be replaced. For these reasons, the present invention can improve the time efficiency of the reactor.

Furthermore, the present invention makes it possible to markedly reduce the number of the kinds of the tag gas used (e.g., by 1/20), compared with the conventional tag gas system, so that the cost of the production of the tag gas can be reduced dramatically and the tag gas concentrator, the analyzer and the computer can be simplified. Hence, the cost of the system of the invention as a whole, including both the initial cost and the running cost, can be reduced, and the kind of the tag gas can be determined even if the leaking quantity is small.

The present invention also reduces dramatically the number of coolant samples that must be collected by the selector valve device (by 1/20, for example), compared with conventional selector valve system, so that the internal construction of the selector valve device can be simplified, and hence the system of the invention as a whole can be made extremely compact in size and light in weight.

It is to be understood that the foregoing description is a preferred embodiment of the invention and that various changes and modifications may be made in the invention without departing from the scope of the appended claims.

What is claimed is:

1. An apparatus for detecting the location of a failed fuel assembly containing a failed fuel pin among a number of fuel assemblies constituting a core of a nuclear reactor having means for flowing coolant into and out of the fuel assemblies, the fuel assemblies being divided into a plurality of groups respectively consisting of first distinct pluralities of fuel assemblies, every fuel pin in the fuel assemblies belonging to the same group being tagged with a distinct gas of the same kind, said apparatus comprising:

means for monitoring the presence of fission product gases released from the failed fuel assembly into a cover gas inside a reactor vessel;

means for detecting the kind of tag gas released from the failed fuel assembly into the cover gas, thereby to identify the group of fuel assemblies which includes the failed fuel assembly;

a plurality of intermediate mixing means for gathering and mixing together coolants delivered thereto, each of said plurality of intermediate mixing means corresponding to a respective subset of fuel assemblies among a plurality of subsets of fuel assemblies, the plurality of subsets consisting of respective second pluralities of fuel assemblies defined such that there is a one-to-one correspondence between each fuel assembly and each combination of one subset and one group;

sampling means for delivering samples of coolant flowing out of each of the fuel assemblies to the respective ones of the intermediate mixing means corresponding to the subsets defined to include the fuel assemblies;

a selector valve means for sequentially collecting the mixed coolants from said plurality of intermediate mixing means; and means for detecting delayed neutrons in the mixed coolants collected by said selector valve means.

2. An apparatus as in claim 1, wherein each fuel assembly is defined in one and only one group and one and only one subset, and each subset includes only one fuel assembly from each group.

3. The apparatus as in claim 1, wherein said tag gas detecting means comprises a tag gas concentrator for recovering and concentrating the tag gas in the cover gas, a mass spectrometer for analyzing the mass of the concentrated tag gas, and an electric computer for receiving an output of the mass spectrometer.

4. The apparatus as in claim 1, wherein said sampling means comprises respective sampling pipes for each fuel assembly, each sampling pipe having a first end communicated with the coolant outflow of the fuel assembly and a second end connected to the intermediate mixing means corresponding to the subset which has been defined to include the fuel assembly.

5. The apparatus as in claim 1, wherein said selector valve means comprises a sliding plate, a rotary pad slidably rotating on the periphery of the sliding plate, a tube extending from the rotary pad and connected to the delayed neutron detecting means, and a plurality of pipes connecting respective ones of the plurality of intermediate mixing means with the sliding plate, said connecting pipes being disposed so that their ends open circumferentially at the periphery of the sliding plate, whereby the open ends of the connecting pipes on the sliding plate are sequentially selected by the rotary pad when the rotary pad slidably rotates on the sliding plate and the mixed coolants from the intermediate mixing means are sequentially led to the delayed neutron detecting means through said tube.

* * * * *